3,218,225
MULTILAYER DECORATIVE LAMINATE
John C. Petropoulos, Norwalk, Conn., assignor to Formica Corporation, Cincinnati, Ohio, a corporation of Delaware
No Drawing. Filed Aug. 1, 1962, Ser. No. 213,894
12 Claims. (Cl. 161—248)

This invention relates to novel, unitary, heat- and pressure-consolidated decorative laminated articles and to methods of preparing such articles. More particularly, this invention relates to novel, heat- and pressure-consolidated, thermoset resin-bonded multilayer decorative laminates suitable for outdoor use wherein the decorative surface comprises a substantially completely cured resinous material which, in its uncured state, is a curable resinous composition comprising a water-insoluble thermoplastic vinyl emulsion copolymer in admixture with a plasticizing and/or cross-linking quantity of a highly alkoxymethylated melamine, said copolymer containing unreacted functional groups which are reactive with the alkoxymethyl groups of said alkoxymethylated melamine.

The many excellent properties possessed by thermoset, i.e., substantially completely cured, amino-triazine-aldehyde resins such as melamine-formaldehyde resins have led to their widespread use in many important applications. This is particularly true in the case of heat- and pressure-consolidated multilayer decorative laminates intended for indoor use either as horizontal working surfaces, such as table, counter and bar tops, or as vertical decorative surfaces, such as decorative panels, cabinet facings, and the like, where durability and good decorative appearance are prime consumer requirements.

The decorative surfaces of laminates of this type, and especially those of laminates used as horizontal working surfaces, are generally subjected to extensive wear. To lend greater durability to these surfaces without detracting from their decorative appearance it is conventional to employ a "translucent" overlay sheet, sometimes referred to as a protective overlay, as the uppermost structural member in the laminate.

Conventional laminates of this type generally comprise, first of all, a base or core member which functions to impart rigidity to the laminate and which usually comprises a solid substrate which may or may not be formed prior to the initial laminating step, e.g., a plurality of sheets of kraft paper impregnated throughout and bonded with a substantially completely cured phenolic resin which has been converted to the thermoset state during the initial laminating step, a precured plastic laminate, such as glass fiber-reinforced thermoset polyester resin laminates and the like, a wood product, such as hardboard, woodwaste or particle boards, plywood, and the like, a mineral base board, such as cement-asbestos board, sheet rock, plaster board, and the like, or a combination of these substrates, e.g., a combination of a plurality of phenolic resin-impregnated kraft paper sheets over a piece of cement-asbestos board, particle board, or the like. A print sheet member, which generally comprises a single sheet or foil of a good grade of absorbent $\alpha$-cellulose or regenerated cellulose paper or similar fibrous material impregnated with a substantially completely cured aminotriazine-aldehyde resin, usually a thermoset melamine-formaldehyde resin, is directly bonded to the base member. As its name implies, the print sheet is usually printed with an ornamental design or dyed or pigmented to impart color thereto. Finally, a protective overlay, generally comprising a single sheet or foil of high grade $\alpha$-cellulose paper or similar fibrous material impregnated with a substantially completely cured aminotriazine-aldehyde resin similar to or the same as that used to impregnate the print sheet member, is directly bonded to the print sheet member.

It has frequently been stated in the prior art that the aminotriazine-aldehyde resins, and more particularly the melamine-formaldehyde resins, which are conventionally used to impregnate the protective overlay are ideally suited to this function, in that their use imparts hardness, clarity and durability to the decorative surfaces of all types of laminates. However, in the case of outdoor laminates it has been found from experience that this is only partially true, and that even laminates prepared using such overlays wherein the amount of melamine-formaldehyde resin employed is sufficient to give a resinous surface layer thick enough to protect the decorative surface of the laminate, and particularly the print sheet portion thereof, from the effects of abrasion as commonly encountered in indoor use will, nevertheless, suffer relatively rapid deterioration on exposure to outdoor conditions, i.e., they will not only craze and crack, but they eventually will become cloudy or even completely opaque.

An explanation of the conditions which lead to this deterioration involves consideration of many factors. First of all, unmodified melamine-formaldehyde resins are relatively inflexible. In addition, they have only moderate dimensional stability, particularly if they have been formed into relatively thick resinous layers, and thus various portions of the resinous surface layer associated with the overlay will undergo markedly uneven expansion and contraction. This lack of dimensional stability is believed to be associated with the free moisture content of the cured resin, with moisture generated through progressive condensation, and also with moisture from the atmosphere. It can be readily appreciated that with the passage of time and with continued exposure to heat and sunlight this free moisture will escape more readily from the thinner portions of the resinous surface layer than from the thicker portions, even if the difference in thickness between these portions is relatively slight, and every indication induces those skilled in the art to believe that when a state of moisture imbalance is eventually reached which will cause dimensional instability, the system, i.e., the relatively inflexible resinous surface layer, will adjust itself by means of cracking or crazing to relieve the built-up dimensional stresses.

At this point another factor enters the picture. Cracking and crazing of the resinous surface layer will in time expose the overlay sheet itself. Once this occurs the fibrous structure of the overlay sheet, acting as a wick, draws moisture from the atmosphere into the laminate. This produces several undesirable results. First of all, it leads to further deterioration of the resinous surface layer. It also causes deterioration of the resinous layer between the overlay and print sheets. Of primary importance, however, is the fact that it causes the overlay and, eventually, the print sheet member (since it too has a fibrous structure), to deteriorate, thus destroying the desired transparency.

Numerous attempts have been made by those skilled in the art to overcome the inherent deficiencies found in melamine-formaldehyde resin-impregnated outdoor decorative laminates. For example, in an attempt to minimize the dimensional instability associated with relatively thick resinous surface layers, laminates of the type in question were prepared using overlays impregnated with just enough melamine-formaldehyde resin to provide a very thin resinous surface layer. It was soon found that wind-driven dust, as well as other sources of abrasion normally encountered in outdoor use, quickly exposed the overlay sheet to atmospheric moisture, leading to the same wicking action by the overlay's fibrous structure and, eventually, to cracking, crazing, cloudiness and opacity.

Another attempt to solve this problem involved the preparation of laminates containing no protective overlay sheet, wherein the decorative surface consisted solely of a layer of melamine-formaldehyde resin on top of a print sheet. However, cured melamine-formaldehyde resin without the reinforcing effect of cellulose fibers or their equivalent is relatively inflexible, and therefore highly susceptible to crazing. As a result, laminates of this type proved to be extremely difficult to fabricate. In most cases they cracked or crazed immediately upon removal from the press, and those that did not deteriorated rapidly on exposure to outdoor conditions. Thus, the experience of the prior art has been that melamine-formaldehyde resin-impregnated decorative laminates, either with or without protective overlays, are unsuitable for outdoor use.

I have now discovered that a solution to each of the problems described hereinabove is provided by either covering or entirely replacing the aforementioned aminotriazine-aldehyde resin-impregnated protective overlay sheet with a decorative surface comprising a substantially completely cured resinous composition which, in its uncured state, is a curable resinous composition comprising (1) a reactive, water-insoluble emulsion copolymer of at least about 50% by weight of (A) a monoethylenically unsaturated hardening comonomer containing no functional groups reactive with N-hydroxymethyl or -alkoxymethyl groups, e.g., methyl methacrylate, with a lesser amount of (B) a monoethylenically unsaturated comonomer containing a functional group which is reactive with N-hydroxymethyl and -alkoxymethyl groups, e.g., methacrylic acid, either alone or together with (C) a monoethylenically unsaturated softening comonomer containing no functional groups reactive with N-hydroxymethyl or -alkoxymethyl groups, e.g., ethyl acrylate, said copolymer, if unplasticized, being incapable of forming a continuous film at ambient temperatures by simple deposition, and (2) a plasticizing and/or cross-linking quantity of a highly alkoxymethylated melamine having from about 5 to 6 alkoxymethyl, i.e., AlkylOCH$_2$-, groups containing 2 to 4 carbon atoms, inclusive, e.g., hexakis(methoxymethyl)melamine, said alkoxymethylmelamine in certain cases, i.e., where said copolymer is present as an aqueous emulsion or dispersion, serving to plasticize said copolymer and in all cases serving to cross-link said copolymer. More particularly, the practice of the present invention provides novel heat- and pressure-consolidated thermoset resin-impregnated multilayer decorative laminates which may be satisfactorily employed for a multitude of outdoor uses, for example as building panels, siding and sheathing, message-bearing signs, and the like, and which are characterized by excellent heat-, solvent- and abrasion-resistance, dimensional stability and resistance to crazing, as well as by excellent decorative effect.

It is, therefore, an object of my invention to provide novel, unitary, heat- and pressure-consolidated, thermoset resin-bonded multilayer decorative laminates.

It is also an object of my invention to provide novel, unitary, heat- and pressure-consolidated, thermoset resin-bonded multilayer decorative laminates suitable for outdoor use wherein the decorative surface of said laminates comprises a substantially completely cured resinous material which, in its uncured state, is a curable resinous composition comprising a water-insoluble thermoplastic vinyl emulsion copolymer containing unreacted functional groups which are reactive with the alkoxy groups in a highly alkoxymethylated melamine, in admixture with a plasticizing and/or cross-linking quantity of said alkoxymethylated melamine.

A further object of my invention is to provide the aforesaid laminates with an aminotriazine-aldehyde, e.g., melamine-formaldehyde, resin-impregnated print sheet overlaid with said substantially completely cured resinous material.

A still further object of my invention is to provide novel aminotriazine-aldehyde, e.g., melamine-formaldehyde, resin-containing unitary, heat- and pressure-consolidated multilayer decorative laminates suitable for outdoor use which are characterized by excellent heat-, solvent- and abrasion-resistance, dimensional stability and resistance to crazing, as well as by excellent decorative effect.

These and other objects of my invention will be discussed more fully hereinbelow.

As previously indicated, in my novel combination of a suitable base or core member overlaid with an aminotriazine-aldehyde resin-impregnated print sheet, which in turn is overlaid with a surface member comprising the substantially completely cured resinous material described both above and in greater detail hereinbelow, any of a plurality of conventional base or core members can be employed. This is due primarily to the fact that the base member usually cannot be seen when the laminate is in use, and also because this part of the laminate is not subjected to ordinary wear.

One highly suitable class of base or core members comprises the phenolic resin-impregnated base members employed in the manufacture of conventional decorative laminates. Such base members are united with the overlay member and print sheet by employing, as the bottommost member of an individual laminating assembly, one or more sheets or plies of a low-cost kraft paper, creped kraft paper, or both, which have been impregnated with the least amount of a thermosetting phenolic resin capable of providing a good bond in the core assembly, e.g., amounts of phenolic resin ranging from about 25% to about 40% by weight, based on the total dry weight of the impregnated paper. The print sheet and overlay members are then placed over this core assembly, and the entire laminating assembly is then consolidated, by means of heat and pressure, in one pressing operation.

Ordinarily, from about 5 to about 8 sheets of phenolic resin-impregnated paper will be used, thereby providing a base member which, in the finished laminate, will usually be at least about one sixteenth of an inch thick. It should be noted, however, that laminates of this type wherein the thickness of the entire assembly of the overlay, print sheet and base members is as little as about one thirty-second of an inch or less, as obtained, for example, by using fewer phenolic resin-impregnated sheets in the base member, can be prepared and are suitable for many uses. Thus, neither the number of sheets of paper, the amount of phenolic resin, nor the thickness ultimately achieved in a base member of this type is critical. However, it has been found that a thickness of at least one sixteenth of an inch in this type of base member is especially desirable when the laminate is consolidated, either during the initial laminating step by means of heat and pressure or afterwards by adhesives bonding, with an additional solid or precured substrate of the type mentioned hereinabove, e.g., a piece of asbestos-cement board, particle board, or the like, in that phenolic resin-impregnated paper base members having at least this minimum thickness are better able to relieve or take up stresses produced by these additional substrates, certain of which are relatively dimensionally unstable, thereby preventing such stresses from causing cracking or crazing on the decorative surface of the laminate. It has also been found that even where no phenolic resin-impregnated paper base member is used, the thickness of the solid substrate used in its place should be at least about one sixteenth of an inch for the same reason, with the thickness of any particular solid substrate chosen being correlated with its density whereby said substrate is adapted to retain its form under moderate stress. The maximum thickness of any of the base members in question is governed by practical considerations, e.g., cost, availability, where and how the finished laminate is to used, and so forth.

The thermosetting phenolic resins used to impregnate a base or core member comprising one or more sheets of kraft or creped kraft paper are well known in the art as shown, for example, in U.S. Patents Nos. 2,205,427; 2,315,087 and 2,328,592, among others, which are incorporated herein by reference. These resins are conventionally obtained by reacting a phenolic substance such as phenol itself, substituted phenols, e.g., alkyl phenols such as cresols, xylenols, tertiary alkyl phenols, and the like, or mixtures of such phenolic substances, with an aldehyde such as formaldehyde, acetaldehyde, propionaldehyde, benzaldehyde, furfural, and the like, or with mixtures of such aldehydes, either alone or in the presence of other aldehyde-reactable substances such as urea, thiourea, substituted ureas and thioureas, aminotriazines, e.g., melamine, lignin derivatives, and the like.

Further details relating to base or core members which can be used in practicing the present invention may be found in U.S. Patent No. 3,021,239 to Lindenfelser et al., which is also incorporated herein by reference.

Just as in the case of the base or core member, the print sheet members employed in preparing laminates according to the practice of the present invention can be identical to those employed in preparing conventional decorative laminates. Ordinarily, a sheet or foil of absorbent α-cellulose or regenerated cellulose paper of from about 4 to about 8 mils thick, impregnated with from about 25% to about 60% by weight, and preferably from about 35% to about 45% by weight, based on the total dry weight of the impregnated paper, of a thermosetting aminotriazine-aldehyde resin, will be employed. Printed designs having an unlimited range or form of artistic effects may be employed, so long as the inks or other coloring matter contained therein are non-bleeding in the aminotriazine-aldehyde resin comprising the infused resin component of the print sheet member. The print sheet also serves as a barrier sheet for the base or core member, thus masking the unattractive appearance of the core and also, in the case of a phenolic resin-impregnated core, barring any extensive bleeding or migration of the phenolic resin from the core, thereby preventing the appearance of said resin on the decorative surface of the laminate.

The thermosetting aminotriazine-aldehyde resins used to impregnate the print sheet member, as well as techniques for their preparation, are also well known in the art, as shown for example in U.S. Patents Nos. 2,197,357 to Widmer et al. and 2,260,239 to Talbot. These conventional thermosetting aminotriazine-aldehyde resins are synthetic resins wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are employed to impregnate the print sheet, but other aminotriazines, e.g., mono-, di- and tri-substituted melamines, such as the mono-, di- and trimethylmelamines, and the like; guanamines, such as formoguanamine, acetoguanamine, benzoguanamine, and the like, as well as mixtures of aminotriazines, may also be utilized as reactants. Similarly, formaldehyde, either as such or as an aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. The properties desired in the finished product and economic considerations are among the elements which will determine the choice of the particular aminotriazine and aldehyde employed.

The mol ratio of aldehyde to aminotriazine in the resinous reaction product is not critical, and may be within the order of from about 1:1 to about 6:1, respectively, depending on the nature of the starting materials and the characteristics desired in the final product, but it is preferred that the mol ratio of aldehyde to aminotriazine be within the order of from about 1.5:1 to about 3:1, respectively.

Conventional reaction conditions are observed in preparing the thermosetting aminotriazine-aldehyde resin. Thus, the aldehyde and aminotriazine may be heat-reacted at temperatures ranging from about 40° C. to reflux temperature, i.e., about 100° C., for periods of time ranging from about 30 to about 120 minutes, at a pH ranging from about 7 to about 10, preferably in aqueous medium. Any substance yielding an alkaline aqueous solution may be used to effect alkaline reaction conditions, for example, alkali metal or alkaline earth metal oxides, hydroxides or salts with weak acids, e.g., sodium, potassium or calcium hydroxide or sodium or potassium carbonate. Mono-, di- or triamines, e.g., triethanolamine, alkaline polyamines or polyalkaline polyamines, e.g., 3,3'-iminobispropylamine and the like, may also be used to effect alkaline reaction conditions. When necessary, acidic substances such as hydrochloric acid, sulfuric acid, phosphoric acid, acetic acid, and the like, or salts thereof may also be employed to regulate the pH.

If desired, the thermosetting aminotriazine-aldehyde resin may be modified by the addition thereto of plasticizers such as α-alkyl-D-glucosides, e.g., α-methyl-D-glucoside, as disclosed in U.S. Patent No. 2,773,848 to Lindenfelser, methylol derivatives of sulfonamides, e.g., N-methylol-p-toluenesulfonamide (which may be formed in situ by the addition of p-toluenesulfonamide to the aminotriazine-aldehyde reaction mixture), or combinations of these glucosides and methylol sulfonamides, as disclosed in U.S. Patent No. 2,773,788 to Magrane et al. In addition, the thermosetting aminotriazine-aldehyde resin may also contain commonly employed curing catalysts, such as phosphoric acid, phthalic acid, p-toluenesulfonic acid, mixtures of alkyl alkylol tertiary amines, e.g., diethylethanolamine, with acids, e.g., acetic acid, and the like, although in most cases uncatalyzed resin will be preferred.

The thermosetting (curable) resinous compositions used to provide a clear, thermoset resin layer as at least part of the overlay member directly bonded to the print sheet member in my novel laminates comprise, as indicated above, mixtures of two essential components. The first of these is a reactive water-insoluble emulsion copolymer prepared from about 50% to about 98% by weight, and preferably from about 65% to about 90% by weight, based on the total weight of monomers in the copolymer, of (A) a monoethylenically unsaturated hardening comonomer, i.e., one whose glass transition temperature [$T_g$, as measured by plotting the specific volume of homopolymers prepared therefrom against temperature; see Tobolsky, "Properties and Structure of Polymers" (New York: John Wiley & Sons, Inc., 1960), at pages 61 to 71, inclusive] is above about 30–35° C., and which tends to form hard, relatively inflexible polymers, said hardening comonomer containing no functional groups which are reactive with an N-hydroxymethyl or -alkoxymethyl group, and from about 2% to about 20% by weight, and preferably from about 5% to about 10% by weight, based on the total weight of monomers in the copolymer, of (B) a monoethylenically unsaturated comonomer containing a functional group which is reactive with an N-hydroxymethyl or -alkoxymethyl group, e.g., a carboxyl, amide or hydroxyl group.

The preferred comonomer (A) is methyl methacrylate.

However, other lower alkyl methacrylates wherein the lower alkyl group contains from 1 to 4 carbon atoms, e.g., ethyl methacrylate, propyl methacrylate, n-butyl methacrylate, isobutyl methacrylate, and the like, as well as mixtures thereof, can be employed in addition to or instead of methyl methacrylate. Furthermore, the lower alkyl methacrylate or methacrylates present can be replaced in whole or in part with one or more different hardening comonomers, such as styrene, alkyl styrenes such as p-methyl styrene and the like, halostyrenes such as chlorostyrene and the like, acrylonitrile, methacrylonitrile, t-amyl methacrylate, t-butyl acrylate, t-amyl acrylate, benzyl methacrylate, vinyl chloride, and the like.

Comonomer (B) is preferably an acrylic (including alkacrylic, haloacrylic, and the like) acid, an acrylic acid amide, a hydroxylated alkyl ester of an acrylic acid, or a mixture of such monomers, and in addition is preferably a hardening comonomer. Included among these reactive group-containing monomers are acrylic acid, methacrylic acid, ethacrylic acid, α-chloroacrylic acid, and the like; the corresponding amides, e.g., acrylamide, methacrylamide, and the like, and hydroxylated alkyl esters of acrylic and methacrylic acid such as β-hydroxyethyl acrylate, β-hydroxyethyl methacrylate, β-hydroxyethyl α'-chloroacrylate, γ-hydroxypropyl acrylate, Δ-hydroxybutyl methacrylate, and the like. In addition, α,β-unsaturated guanamines, such as methacryloguanamine, N-phenylmethacryloguanamine, and the like, can also be employed as reactive group-containing monomers.

If desired, the reactive water-insoluble emulsion copolymer may also include (C) a monoethylenically unsaturated softening comonomer, i.e., one whose glass transition temperature is below about 15–20° C. and which tends to form soft, relatively flexible polymers, said softening comonomer containing no functional groups which are reactive with an N-hydroxymethyl or -alkoxymethyl group. These softening monomers preferably comprise an alkyl acrylate wherein the alkyl group contains from 1 to about 12 carbon atoms, such as methyl acrylate, ethyl acrylate, propyl acrylate, n-butyl acrylate, 2-ethylhexyl acrylate, octyl acrylate, dodecyl acrylate, and the like, as well as mixtures thereof, and can be present in the copolymer in amounts ranging from 0% to about 45% by weight, based on the total weight of monomers in the copolymer, depending on the properties or combinations of properties, e.g., hardness coupled with flexibility, desired in the final product. Comonomer (C), if employed, will generally replace part of comonomer (A), but in any event, the total amount of hardening monomer(s) present will be such that the copolymer, if unplasticized, will be incapable of forming continuous films at ambient temperatures. This usually means that the copolymer will contain not less than about 50% by weight, based on the total weight of monomers in the copolymer, of hardening monomer(s). Furthermore, in every case the total amount of comonomers (A) and (B) or (A), (B) and (C) employed will equal 100%.

Suitable methods for the preparation of aqueous emulsion copolymers of the type employed in practicing the present invention from monomers such as those listed hereinabove are so numerous and so well known in the art that only the most cursory treatment of such methods is necessary here. In general, the selected comonomers are emulsified in water, using from about 1% to about 10% by weight, based on the total weight of monomers present, of a conventional emulsifying agent. This emulsifying agent can be non-ionic, e.g., an alkylphenoxypolyethoxyethanol having alkyl groups of from about 7 to about 18 carbon atoms in length and from about 6 to about 60 oxyethylene units, such as the heptylphenoxypolyethoxyethanols, methyloctylphenoxypolyethoxyethanols, dodecylphenoxypolyethoxyethanols, and the like; a long chain fatty acid derivative of sorbitol, such as sorbitan monolaurate, monopalmitate, monostearate, tristerate, and the like; an ethylene oxide derivative of an etherified or esterified polyhydroxy compound having a hydrophobic carbon chain, such as a polyoxyethylene sorbitan monolaurate, monopalmitate, monosterate, and the like, anionic, e.g., sodium lauryl sulfonate, sodium isopropylnaphthalene sulfonate, di-2-ethylhexyl sodium sulfosuccinate, and the like, or a mixture of non-ionic and anionic emulsifying agents. Where an aqueous emulsion or dispersion of the reactive copolymer in admixture with the highly alkoxymethylated melamine is used to provide at least part of the upper decorative surface in my novel laminates, the pH of the aqueous emulsion or dispersion containing the reactive copolymer will be adjusted to at least 7, and preferably higher, prior to adding the highly alkoxymethylated melamine. In such a case cationic emulsifying agents, due to their instability under basic conditions, are not particularly preferred. However, where a solution obtained by separating the reactive copolymer from the aqueous emulsion or dispersion and then dissolving the copolymer, together with the highly alkoxymethylated melamine, in an inert organic solvent, is used in preparing the laminate, cationic emulsifying agents, such as stearamidopropyldimethyl-2-hydroxyethyl-ammonium phosphate and the corresponding nitrate, stearyldimethylbenzylammonium chloride, and the like, as well as mixtures thereof with each other or with anionic or non-ionic emulsifying agents, can be used to emulsify the copolymerizable monomers.

The emulsified comonomers are copolymerized by means of a catalytic amount of a conventional free radical polymerization catalyst or catalyst system, e.g., an inorganic or organic peroxide such as hydrogen peroxide, t-butyl hydroperoxide, cumene hydroperoxide, and the like, an azo nitrile, such as α,α'-azobisisobutyronitrile and the like, an inorganic persulfate, such as ammonium persulfate, sodium persulfate, potassium persulfate, and the like, or a redox catalyst system, such as sodium metabisulfite-potassium persulfate and the like. The particular catalyst or catalyst system chosen can generally be used in amounts ranging from about 0.01% to about 3% by weight, based on the total weight of comonomers present. The polymerization reaction can be carried out at temperatures ranging from about 0° C. to about 100° C., preferably at from about room temperature (25° C.) to about 70° C., and the emulsion will preferably be agitated during the reaction. The resulting aqueous emulsion copolymer can have a molecular weight ranging from about 25,000 to about 1,000,000 or higher, as determined by intrinsic viscosity measurements [see Flory, "Principles of Polymer Chemistry" (Ithaca, N.Y.: Cornell University Press, 1953), pages 308 to 311]. The amount of the reactive copolymer present in the emulsion or dispersion can be varied within wide limits, depending on such interrelated variables as, for example, the thickness desired in the surface layer or film, the solids concentration desired, etc., but in general the reactive copolymer will be present in the emulsion or dispersion in amounts ranging from about 30% to about 60% by weight, and usually from about 40% to about 50% by weight, based on the total weight of said emulsion or dispersion.

As previously indicated, following the copolymerization reaction the pH of the aqueous emulsion or dispersion is adjusted to at least 7, e.g., to between 7 and about 10, and preferably to between about 7.5 and about 9.5, if it is desired to use an emulsion system when preparing the laminate. This pH regulation is carried out in order to maintain a stable system once the highly alkoxymethylated melamine is added. Any basic substance, e.g., sodium hydroxide, potassium hydroxide, and the like, may be used to adjust the pH, but it is preferred that the basic substance employed be a volatile base, such as ammonia, triethylamine, and the like, which can be volatilized off to provide the acidic conditions necessary for the highly alkoxymethylated melamine to crosslink the reactive aqueous emulsion copolymer through its reactive functional groups.

The second essential component of the curable resinous composition is a highly alkoxymethylated melamine represented by the general formula:

$$MF_xA_y$$

wherein M represents melamine, the starting material, $F_x$ represents the degree to which the melamine starting material has been methylolated, with $x$ representing a number between about 5 and 6, inclusive, and $A_y$ represents the degree to which the methylol groups of the polymethylolmelamine intermediate have been alkylated with lower alkyl groups containing from 1 to 3 carbon atoms, inclusive, i.e., methyl, ethyl and propyl groups, to provide alkoxymethyl groups containing from 2 to 4 carbon atoms, inclusive, in the highly alkoxymethylated melamine final product, with $y$ representing a number between 5 and 6, inclusive. Thus, the highly alkoxymethylated melamines employed in the practice of the present invention include the hexa-alkyl ethers of hexamethylolmelamine, such as hexakis(methoxymethyl)-melamine and the like, which represent the highest degree of methylolation and alkylation obtainable, the penta-alkyl ethers of hexamethylolmelamine, such as the pentamethyl ether of hexamethylolmelamine and the like, and the penta-alkyl ethers of pentamethylolmelamine, such as the pentamethyl ether of pentamethylolmelamine and the like. Furthermore, as is evident from the general formula and the values of $x$ and $y$ given above, one can use mixtures of these highly alkoxymethylated melamines, e.g., a mixture of hexakis(methoxymethyl)melamine and the pentamethyl ether of hexamethylolmelamine, as well as mixtures containing minor amounts of alkoxymethylated melamines having a slightly lower degree of methylolation or alkylation. In such cases $x$ and $y$ represent average values for the degree of methylolation and alkylation. Hexakis(methoxymethyl)melamine or mixtures containing a major amount thereof together with minor amounts of other highly methoxymethylated melamines having slightly lower degrees of methylolation and methylation are preferred for use in practicing the present invention.

Highly alkoxymethylated melamines are prepared by methods which are so well known in the art that it is not necessary that they be set forth herein in any great detail. In general, these conventional methods involve the basic steps of reacting melamine with aqueous formaldehyde in mol ratios ranging from about 6.5 to about 20 mols or more of formaldehyde per mol of melamine to form polymethylolmelamines; removing the bulk of the water from the thus-formed polymethylolmelamines, and thereafter reacting the polymethylolmelamines, under acidic conditions, with from about 10 to about 20 mols of a lower alkanol, such as methanol, ethanol, propanol, and the like, per mol of melamine starting material. Various modifications and improvements of this basic process have been developed, such as those set forth in U.S. Patent Nos. 2,715,619 to Suen et al. and 2,918,452 to Kun et al.

The highly alkoxymethylated melamine can be added to an aqueous emulsion or dispersion containing the reactive copolymer either as a liquid melt or as a high solids dispersion in water, e.g., a dispersion of highly alkoxymethylated melamine containing from about 30% to about 60% solids, and preferably from about 40% to about 50% solids. In this case the plasticizing and cross-linking amount of highly alkoxymethylated melamine employed can range from about 10% to about 100% by weight, based on the weight of the reactive copolymer, depending on the composition of the particular reactive copolymer employed, the highly alkoxymethylated melamine or mixture of highly alkoxymethylated melamines used to plasticize and cross-link the reactive copolymer, and the conditions of temperature and pressure under which the laminate is prepared. The plasticizing and cross-linking agent will usually be present in an amount such that the ratio of the weight of highly alkoxymethylated melamine plus any softening comonomer [comonomer (C) and possibly comonomer (B)] present in the reactive copolymer to the weight of the hardening comonomers [comonomer (A) and possibly comonomer (B)] present in the reactive copolymer will range from about 0.3:1 to about 1.5:1, respectively, said ratio increasing towards the above-stated maximum as the temperature at which a sample of the aqueous emulsion or dispersion containing the reactive copolymer and the highly alkoxymethylated melamine must be dried to give a continuous film decreases from a maximum of about 170° C. to a minimum of about 25° C.

As is evident from the foregoing, the highly alkoxymethylated melamine, when used in admixture with an aqueous emulsion or dispersion of the reactive copolymer, performs a twofold function. First of all, it acts to plasticize the reactive copolymer, which is still in the thermoplastic state, by coalescing the separate copolymer particles into a continuous film during the time at which water is being driven off from the aqueous emulsion or dispersion. Secondly, the highly alkoxymethylated melamine also serves to effect cross-linking between the essentially linear reactive copolymer chains by reacting with the residual functional groups, i.e., the carboxyl, amide or hydroxyl groups, contained therein.

When the aqueous emulsion or dispersion is coagulated and the reactive copolymer separated therefrom is dissolved, together with the highly alkoxymethylated melamine, in a readily volatile inert organic solvent, e.g., one having a boiling point, at atmospheric pressure, between about 90° C. and 110° C., such as acetone, methyl ethyl ketone, diethyl keton, benzene, toluene, methylene chloride, dioxane, and the like, no plasticizing or coalescing action on the part of the highly alkoxymethylated melamine is necessary. However, this component still serves as a cross-linking agent, and thus, just as in the case of the aqueous emulsions or dispersions, it will be added to the solution in amounts ranging from about 10% to about 100% by weight, based on the weight of the reactive copolymer present. Just as in the case of the emulsions or dispersions, the amount of the reactive copolymer present in solution can be varied within wide limits, depending again on such factors as the thickness desired in the surface layer or film, the viscosity and solids concentration, etc., but in general the reactive copolymer will be present in amounts ranging from about 10% to about 40% or higher by weight, based on the total weight of the solution. Due to the fact that the viscosity of these solutions will be higher than the viscosity of the corresponding emulsions, the latter are capable of being prepared at higher solids contents than the former.

Whether an aqueous emulsion or dispersion containing the reactive copolymer or a solution of said copolymer in an inert organic solvent is used to provide the upper decorative surface in my novel laminates, the advantages flowing from the presence of the ractive copolymer will be obtained. First of all, as previously indicated, these copolymers have relatively high molecular weights, due primarily to their being prepared in an emulsion polymerization system. As a result, they give thicker layers or films than would a corresponding copolymer prepared in a solution or bulk polymerization system from the same monomeric starting materials. Furthermore, as a corrolary to this, less polymeric material is needed to provide the decorative surface of the laminate with this layer or film. Finally, these reactive emulsion copolymers, again due primarily to their relatively high molecular weights, tend to stay at the decorative surface of the laminate rather than dissipate throughout its interior structure.

Conventional laminating techniques are employed in preparing laminates according to the practice of the present invention. Thus, the print sheet and, where a phenolic resin-impregnated paper base or core member is employed, the sheets constituting said base or core member, are first impregnated with solutions or dispersions of the respective resins using such methods as dipping, roll coating, spraying, or the like, and then dried at elevated temperatures, using a forced hot air drying oven, infrared heating means, or the like, to a desired volatile content. Thus, for example, the print sheet usually will be dried to a volatile content of less than about 10% by weight, and preferably from about 3% to about 6% by weight, while the sheets constituting said core member will generally be dried to a volatile content of less than about 12% by weight, and preferably from about 6% to about 10% by weight, each of said volatile contents being based on the total weight of the respective dried, impregnated sheets.

The above-described curable resinous compositions comprising the reactive copolymer in admixture with the highly alkoxymethylated melamine can be used in any of several ways to provide the upper decorative surface in my novel laminates. Thus, first of all, a sheet or foil of α-cellulose paper identical so that used in preparing a conventional aminotriazine-aldehyde resin-impregnated protective overlay can be impregnated instead with an aqueous emulsion or dispersion of the curable resinous composition or with a solution thereof in an inert organic solvent, using any of the conventional impregnating methods, e.g., dip coating, and then dried at a temperature below that at which the reaction mixture comprising the reactive copolymer and the highly alkoxymethylated melamine will be substantially advanced in cure, e.g., at a temperature of from about room temperature, i.e., about 25° C., to about 170° C., preferably at a temperature of from about 70° C. to about 130° C., for from about 5 minutes at the upper end of the above-recited broad temperature range to about several hours, i.e., four hours or more, at its lower end, and preferably for from about 10 minutes to about 30 minutes. Inasmuch as a certain amount of cross-linking between the reactive copolymer and the highly alkoxymethylated melamine is desirable, although not essential, prior to the time at which the entire laminating assembly is consolidated in a laminating press, and since cross-linking takes place at temperatures above about 100° C., it is evident that any desired degree of advancement in cross-linking can be accomplished either during the drying step, if drying is carried out at sufficiently elevated temperatures, or subsequent thereto, by heating at temperatures of from about 100° C. to about 170° C. or higher for from about 2 minutes to about 60 minutes, if drying is carried out at relatively low temperatures, e.g., room temperature. However, in any event the amount of advancement in cross-linking accomplished either while drying under the above-recited conditions or by further heating at the above-stated temperatures subsequent to drying will not be sufficient to substantially advance the cure of the mixture of the reactive copolymer and the highly alkoxymethylated melamine, i.e., to the point at which this resinous reaction mixture will not exhibit satisfactory flow in the laminating press. Finally, whether an aqueous emulsion or dispersion or a solution of the curable resinous composition is used, the sheet or foil will be impregnated with from about 50% to about 90% by weight, and preferably from about 70% to about 85% by weight, based on the total dry weight of the impregnated paper. This method of providing an upper decorative surface results in laminates having decorative surfaces which exhibit excellent abrasion resistance and impact resistance.

Preferably, however, the α-cellulose overlay sheet will be omitted and the curable resinous composition used to provide a clear top film over the aminotriazine-aldehyde resin-impregnated print sheet. In this case, the surface of the dried, resin-impregnated print sheet opposite the side which will be in contact with the base or core member is coated, e.g., by brush-, roller-, or spray-coating or the like, with the curable resinous composition in the form of an aqueous emulsion or dispersion or a solution in an inert, volatile organic solvent, preferably one which is substantially non-reactive with the thermosetting aminotriazine-aldehyde resinous imgrepnant in the print sheet under the conditions employed in this technique, such as any of those relatively volatile inert organic solvents listed hereinabove, to give a coating which will ultimately result in a clear top film having a thickness of from about 0.5 mil to about 7 mils, and preferably from about 2 mils to about 4 mils. The solvent or water is then evaporated, either by letting the coated print sheet stand at room temperature or by heating the sheet at a temperature below that at which the thermosetting aminotriazine-aldehyde resinous impregnant of the print sheet will be substantially advanced in cure, e.g., under the conditions of temperature and time recited hereinabove for drying the reactive copolymer/highly alkoxymethylated melamine-impregnated α-celluose overlay sheet or foil, leaving the dried, coated print sheet ready for lamination. In addition, the same considerations obtain here with respect to advancement of the degree of cross-linking of the resinous impregnant as in the case of the α-cellulose overlay sheet or foil. This method of providing an upper decorative surface results in laminates which, although they have slightly less abrasion resistance than those laminates prepared according to the present invention using an α-cellulose overlay, are significantly superior with respect to lack of any possibility of fiber bloom, haziness, etc., which defects are primarily due to stresses set up by the presence of an overlay sheet.

In any of the methods described herein for obtaining an upper decorative surface comprising the resinous reaction product of a reactive copolymer and a highly alkoxymethylated melamine, one or several treatments with an emulsion, dispersion or solution can be carried out to give the desired thickness in the layer or film. As can be readily appreciated, where several treating passes are made the solids content of the medium can be low, while for one pass operations higher solids contents will be required.

An alternative means of providing a clear top film of the curable resinous composition involves first preparing a conventional aminotriazine-aldehyde resin-impregnated overlay sheet, i.e., an α-cellulose sheet of from about 2 mils to about 5 mils thick which is first impregnated with from about 60% to about 75% by weight, and preferably from about 65% to about 70% by weight, based on the total dry weight of the impregnated sheet, of a resin similar to or the same as that used to impregnate the print sheet member and then dried to a volatile content of less than about 10% by weight, and preferably from about 3% to about 6% by weight, based on the total weight of the dried, impregnated sheet. The surface of the dried, resin-impregnated overlay sheet opposite the side which will be in contact with the print sheet member is then coated with the curable resinous composition and dried in the same manner as described above in connection with the same treatment carried out on a dried, resin-impregnated print sheet member, leaving a dried, coated overlay sheet ready for lamination.

The members making up the laminating assembly, i.e., an overlay sheet impregnated with the curable resinous composition and the print sheet member, or a print sheet member coated with the curable resinous composition, or an aminotriazine-aldehyde resin-impregnated overlay member coated with the curable resinous composition and the print sheet member, are then assembled, together with the base or core member, or with the individual sheets which, when consolidated by means of heat and pressure, will constitute all or part of the base or core member, and then inserted in a laminating press between laminating press plates, e.g., stainless steel press plates which may have finishes ranging from a mirror polish to a matt surface, either as a single assembly or as a multiple assembly of two or more of such single assemblies, and consolidated by means of heat and pressure into a unitary decorative structure. Besides laminates having only one decorative surface, balanced laminates wherein a mirror-image assembly of the decorative members is bonded to each side of a base or core member may also be prepared.

Temperatures ranging from about 135° C. to about 170° C., preferably from about 150° C. to about 160° C., and pressures ranging from about 150 p.s.i. to about 1500 p.s.i., will be employed. The particular pressure employed depends in large measure upon the nature of the base or core member employed. For example, where a conventional "low pressure" substrate, e.g., flakeboard, plywood, and the like, is used pressures ranging from about 150 to about 350 p.s.i., and preferably from about 250 to about 300 p.s.i., will be used. Conversely, when a conventional "high pressure" substrate, e.g., a plurality of sheets of phenolic resin-impregnated paper, a cement-asbestos board, and the like, is used pressures ranging from about 600 to about 1500 p.s.i., and preferably from about 1100 to about 1200 p.s.i., will generally be employed. The time required to effect substantially complete cure of the resinous components of the assembly when employing temperatures and pressures within the above-stated ranges will usually be from about 15 minutes to about 45 minutes. The resulting laminate is generally allowed to cool to a temperature of less than about 50° C., and preferably to room temperature, before being removed from the press.

In order that those skilled in the art may more fully understand the inventive concept presented herein, the following examples are set forth. These examples are given solely by way of illustration, and should not be considered as expressing limitations unless so set forth in the appended claims. All parts and percentages are by weight, unless otherwise stated.

*Preparation of Dispersion A (90/10—methyl methacrylate/methacrylic acid)*

A solution containing 6 parts of dioctyl sodium sulfosuccinate, 11.4 parts of Triton X-305 (a 70% active solution of an octylphenol-ethylene oxide condensate) and 0.8 part of sodium bicarbonate dissolved in 1100 parts of water was charged to a suitable reaction vessel equipped with thermometer, stirrer, reflux condenser, inert gas inlet tube and addition funnel. After flushing the solution with nitrogen gas for 30 minutes (a stream of nitrogen gas was employed to maintain an inert atmosphere throughout the reaction) and then heating it to 60° C. with stirring (stirring being maintained throughout the preparation), a solution of 1 part of ammonium persulfate in 100 parts of water was added. Five minutes later, after heating the resulting solution to 75° C., 164 parts of a monomer-emulsifier mixture containing 720 parts of methyl methacrylate, 80 parts of methacrylic acid and 17.2 parts of Triton X-305 were added. At this point the temperature of the resulting emulsified reaction mixture rose exothermically to 85° C. When the temperature began to drop, the remainder of the monomer-emulsifier mixture was added dropwise to the emulsion over a period of about one hour, during which time the temperature was maintained at between 77° C. and 82° C. After the last addition of the monomer-emulsifier mixture the emulsion was maintained at between about 75° C. and 80° C. for 30 minutes and then allowed to cool to room temperature. During cooling the reflux condenser and thermometer were removed and a rapid stream of nitrogen gas was passed through the reaction vessel to remove any unreacted monomers. Finally, the pH was adjusted to 8.2 with concentrated ammonia and the product was then filtered through cheesecloth, giving an aqueous polymer dispersion having a solids content of 45.7%.

*Preparation of Dispersions B–L*

In a manner similar to that set forth for the preparation of Dispersion A, the aqueous dispersions described in Table I below in terms of their polymeric components, pH's and solids concentrations were prepared.

TABLE I

| Dispersion | Polymeric Component [1] | pH | Percent Solids Concentration |
|---|---|---|---|
| B | 60/30/10—MMA/EA/MAA | 7.6 | 41 |
| C | 60/35/5—MMA/EA/MAA | 7.1 | 41.7 |
| D | 45/25/20/10—MMA/EA/AN/MAA | 7.5 | 39 |
| E | 50/25/20/5—MMA/EA/AN/MAA | 7.6 | 42 |
| F | 85/15—BMA/MAA | 7.5 | 35 |
| G | 60/25/15—MMA/BMA/MAA | 7.0 | 35 |
| H | 75/15/10—MMA/EHA/MAA | 7.8 | 41 |
| I | 50/45/5—MMA/EA/β-HEMA | 8.3 | 48 |
| J | 52.5/42.5/5—MMA/EA/MA | 9.5 | 45 |
| K | 60/35/5—MMA/EA/AA | 7.1 | 42 |
| L | 60/35/5—S/EA/MAA | 8.1 | 40 |

[1] Monomers are expressed in parts, e.g., Dispersion B contains a copolymer of 60 parts of methyl methacrylate, 30 parts of ethyl acrylate and 10 parts of methacrylic acid.

MMA = methyl methacrylate.
BMA = butyl methacrylate.
S = styrene.
EA = ethyl acrylate.
EHA = 2-ethylhexyl acrylate.
AN = acrylonitrile.
MAA = methacrylic acid.
β-HEMA = β-hydroxyethyl methacrylate.
MA = methacrylamide.
AA = acrylamide.

EXAMPLE I

The required amounts of Dispersion A and a 35% aqueous dispersion of hexakis(methoxymethyl)melamine were admixed to provide a treating dispersion having a weight ratio of copolymer solids: hexakis(methoxymethyl)melamine of 70:30, respectively. Next, a sheet of commercially available α-cellulose overlay paper, 2 mils thick, was brush-coated on one side with the treating dispersion and then dried for 10 minutes at 80° C., resulting in an impregnated overlay sheet having a resin solids content of 80%, based on the total dry weight of the impregnated sheet.

The dried, impregnated overlay sheet was incorporated in a laminating assembly consisting of (from the bottom up), 3 sheets of standard thermosetting phenolic resin-impregnated creped kraft paper, 4 sheets of standard thermosetting phenolic resin-impregnated uncreped kraft paper, a standard thermosetting melamine-formaldehyde resin-impregnated α-cellulose print sheet printed with a wood grain design, and the dried, impregnated overlay sheet, with the Dispersion A/hexakis(methoxymethyl) melamine-coated surface facing away from the print sheet. This laminating assembly was then placed between a pair of stainless steel press plates and consolidated in a laminating press at a temperature of 150° C. under a pressure of 1100 p.s.i. for 30 minutes. The resulting laminate was allowed to cool to room temperature before being removed from the press. It had a hard, clear, glossy decorative surface and was suitable for use outdoors.

EXAMPLES II–XII

In each of these examples the procedure employed in Example I was repeated in every detail except for the following. Dispersions B through L, respectively, were used in place of Dispersion A, and the weight ratio of copolymer solids:hexakis(methoxymethyl)melamine employed was in some cases different from that used in Example I (as shown in Table II below). In addition, in Examples VI through XII, inclusive, solid hexakis(methoxymethyl)melamine was melted and added to the respective copolymer dispersions in this form rather than as an aqueous dispersion, and the overlay sheets were dip-coated rather than brushed with the resulting dispersions, giving, in each case, a resin pickup of about 80%, based on the total dry weight of the impregnated sheet. In all cases, the resulting laminates had hard, clear decorative surfaces and were suitable for outdoor use.

TABLE II

| Example | Dispersion | Ratio of Copolymer Solids:Hexakis (methoxymethyl) melamine |
|---|---|---|
| II | B | 80:20 |
| III | C | 80:20 |
| IV | D | 80:20 |
| V | E | 85:15 |
| VI | F | 70:30 |
| VII | G | 75:25 |
| VIII | H | 80:20 |
| IX | I | 70:30 |
| X | J | 70:30 |
| XI | K | 80:20 |
| XII | L | 70:30 |

EXAMPLE XIII

Three unimpregnated α-cellulose overlay sheets identical to those used in the preceding examples were dipped in a 95/5 water-isopropanol solution of a thermosetting melamine-formaldehyde resin (mol ratio formaldehyde: melamine of 2:1, respectively) having a resin solids content of about 46% and then dried to a volatile content of 4%. The resulting dried, impregnated sheets had a melamine-formaldehyde resin solids content of about 60%, based on the total dry weight of the impregnated sheet. Next, the impregnated sheets were brush-coated on one side with a quantity of Dispersion E admixed with sufficient melted hexakis(methoxymethyl)-melamine to give a dispersion having a weight ratio of copolymer solids:hexakis(methoxymethyl)melamine of 91:9, respectively, and then dried at 90° C. for 30 minutes to give, in each case, an overlay sheet having a copolymer-hexakis(methoxymethyl)melamine resin solids content of about 78%, based on the total dry weight of the impregnated sheet.

The first of these dried, impregnated overlay sheets was incorporated in a laminating assembly in the same manner as described in Example I above, i.e., together with the standard thermosetting phenolic resin-impregnated kraft paper core and a standard thermosetting melamine formaldehyde resin-impregnated print sheet (with the Dispersion E/hexakis(methoxymethyl)melamine-coated surface of the overlay sheet facing away from the print sheet), and then pressed between a pair of stainless steel press plates at a temperature of 150° C. under a pressure of 1100 p.s.i. for 30 minutes.

The second dried, impregnated overlay sheet was incorporated in a laminating assembly consisting of (from the bottom up) a ⅜ inch thick piece of 3-ply plywood, a standard thermosetting melamine-formaldehyde resin-impregnated print sheet, and the overlay sheet, with its Dispersion E/hexakis(methoxymethyl)melamine - coated surface facing away from the print sheet. This assembly was then pressed at a temperature of 150° C. under a pressure of 300 p.s.i. for 30 minutes.

The third dried, impregnated overlay sheet was laminated in the same manner as the second sheet with one exception—a ⅜ inch thick piece of flakeboard was used in place of the plywood core.

All three laminates had hard, clear, glossy decorative surfaces and were suitable for outdoor use.

EXAMPLE XIV

A standard print sheet bearing a wood print design and impregnated with 40%, based on the total dry weight of the impregnated sheet, of a thermosetting melamine-formaldehyde resin having a mol ratio of formaldehyde:melamine of 2:1, respectively, and having a volatile content of 6%, was roller-coated on one side with the mixture of Dispersion E and hexakis(methoxymethyl)melamine used in Example XIII above. The coated sheet was then air-dried for one hour at room temperature, resulting in a sheet having a copolymer-hexakis-(methoxymethyl)melamine resin solids content of 9 grams per square foot.

Next, the dried, coated print sheet was positioned, coated side up, over a ⅜ inch thick piece of 3-ply plywood. This assembly was then placed between a pair of stainless steel press plates and consolidated in a laminating press at a temperature of 150° C. under a pressure of 300 p.s.i. for 30 minutes. The resulting laminate was allowed to cool to room temperature before being removed from the press. It had a hard, glossy decorative surface, with the upper 3 mils thereof being a clear, colorless film of the reaction product of the copolymer and hexakis(methoxymethyl)melamine, which exhibited the design on the print sheet with excellent clarity. In addition, the laminate was suitable for outdoor use.

EXAMPLE XV

The procedure employed in Example XIV was repeated in every detail, except for the following. After coating one side of the thermosetting melamine-formaldehyde resin-impregnated print sheet with the mixture of Dispersion E and hexakis(methoxymethyl)melamine, the coated sheet was dried at 80° C. for 20 minutes, resulting in a sheet having a copolymer-hexakis(methoxymethyl)melamine resin solids content of 12 grams per square foot. In addition, a ⅛ inch thick piece of cement-asbestos board was used in place of the plywood core. The decorative surface of the resulting laminate was equally as attractive as that of the laminate of Example XIV and was also suitable for outdoor use. The upper 4 mils of said decorative surface consisted of a hard, clear, colorless film of the reaction product of the copolymer and hexakis(methoxymethyl)melamine.

EXAMPLE XVI

The procedure employed in Example XIV was again repeated in every detail, except for the following. Dispersion E was replaced by an amount of Dispersion C sufficient to give a weight ratio of copolymer solids: hexakis(methoxymethyl)melamine of 100:30, respectively. After coating the thermosetting melamine-formaldehyde resin-impregnated print sheet on one side with the mixture of Dispersion C and hexakis(methoxymethyl) melamine, the coated sheet was dried at 80° C. for 10 minutes, resulting in a sheet having a copolymer-hexakis-(methoxymethyl)melamine resin solids content of 6 grams per square foot. Finally, the plywood core was replaced by a ⅜ inch thick piece of flakeboard, and the resulting assembly was laminated at a temperature of 170° C. under a pressure of 350 p.s.i. for 30 minutes. The decorative surface of the resulting laminate, the upper 2 mils of which consisted of a hard, clear colorless film of the reaction product of the copolymer and hexakis-(methoxymethyl)melamine, exhibited the design on the print sheet with excellent clarity. In addition, the laminate was suitable for outdoor use.

EXAMPLE XVII

A quantity of Dispersion B was admixed with acetone to coagulate and precipitate the methyl methacrylate/ ethyl acrylate/methacrylic acid copolymer. The precipitated copolymer was then poured into a shallow container and dried at 80° C. until substantially all of the acetone and water evaporated therefrom. Next, the copolymer solids were dissolved in acetone to give a 30% solution, and to this solution there was then added and dissolved an amount of hexakis(methoxymethyl)melamine sufficient to result in a weight ratio of copolymer solids:hexakis(methoxymethyl)melamine of 100:30, respectively. A standard thermosetting melamine-formaldehyde resin-impregnated print sheet was brush-coated with the solution and then dried by first air-drying at room temperature for 30 minutes and then at 80° C. for 10 minutes to give a sheet having a copolymer-hexakis-(methoxymethyl)melamine resin solids content of 9 grams per square foot.

Next, the dried, coated print sheet was positioned, coated side up, over a ⅛ inch thick piece of cement-asbestos board. This assembly was then placed between a pair of stainless steel press plates and consolidated in a laminating press at a temperature of 160° C. under a pressure of 300 p.s.i. for 30 minutes. The resulting laminate had a hard, glossy decorative surface, with the upper 3 mils thereof being a clear, colorless film of the reaction product of the copolymer and hexakis(methoxymethyl)melamine, which exhibited the design on the print sheet with excellent clarity. In addition, the laminate was suitable for outdoor use.

It will be obvious to those skilled in the art that other changes and variations can be made in carrying out the present invention without departing from the spirit and scope thereof as defined in the appended claims.

I claim:

1. A unitary, heat- and pressure-consolidated laminated article which comprises a superimposed assembly of:
   (1) a rigidity-imparting base member,
   (2) a print sheet member, directly bonded to said base member, comprising a fibrous sheet impregnated with a substantially insoluble and infusible aminotriazine-aldehyde resin, and
   (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 50% to about 98% by weight of a monoethylenically unsaturated hardening comonomer, (b) from about 2% to about 20% by weight of a monoethylenically unsaturated comonomer containing a functional group selected from the group consisting of carboxyl, amide and hydroxyl functions and which is reactive with N-hydroxymethyl and -alkoxymethyl groups, and (c) from 0% to about 45% by weight of a monoethylenically unsaturated softening comonomer, the weights of said (a), (b) and (c) each being based on the total weight of monomers in said copolymer, and (B) a plasticizing quantity of from 10 to 100% by weight of a highly alkoxymethylated melamine having from about 5 to 6 alkoxymethyl groups, said alkoxymethyl groups containing 2 to 4 carbon atoms, inclusive, said alkoxymethylated melamine also serving to cross-link said copolymer.

2. A unitary, heat- and pressure-consolidated laminated article which comprises a superimposed assembly of:
   (1) a rigidity-imparting base member,
   (2) a print sheet member, directly bonded to said base member, comprising a fibrous sheet impregnated with a substantially insoluble and infusible aminotriazine-aldehyde resin, and
   (3) a clear thermoset resin layer, directly bonded to said print sheet member comprising a substantially insoluble and infusible resinous composition which, in its thermosetting state, comprises (A) a reactive, water-insoluble emulsion copolymer of (a) from about 50% to about 98% by weight of a lower alkyl methacrylate wherein the alkyl group contains from 1 to 4 carbon atoms, inclusive, (b) from about 2% to about 20% by weight of a monoethylenically unsaturated comonomer containing a functional group selected from the group consisting of carboxyl, amide and hydroxyl functions which is reactive with N-hydroxymethyl and -alkoxymethyl groups selected from the group consisting of carboxyl, amide and hydroxyl groups, and (c) from 0% to about 45% by weight of an alkyl acrylate wherein the alkyl group contains from 1 to about 12 carbon atoms, inclusive, the weights of said (a), (b) and (c) each being based on the total weight of monomers in said copolymer, and (B) a plasticizing quantity of from 10–100% by weight based on the weight of the reactive copolymer of a highly methoxymethylated melamine having from about 5 to 6 methoxymethyl groups, said methoxymethyl melamine also serving to cross-link said copolymer.

3. A unitary, heat- and pressure-consolidated laminated article which comprises a superimposed assembly of:
   (1) a rigidity-imparting base member,
   (2) a print sheet member, directly bonded to said base member, comprising a fibrous sheet impregnated with a substantially insoluble and infusible melamine-formaldehyde resin, and
   (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 50% to about 98% by weight of methyl methacrylate, (b) from about 2% to about 20% by weight of methacrylic acid, and (c) from 0% to about 45% by weight of ethyl acrylate, the weights of said (a), (b) and (c) each being based on the total weight of monomers in said copolymer, and (B) a plasticizing quantity of from 10–100% by weight based on the weight of the reactive copolymer of hexakis(methoxymethyl)melamine, said hexakis(methoxymethyl)melamine also serving to cross-link said copolymer.

4. A unitary, heat- and pressure consolidated laminated article which comprises a superimposed assembly of:
   (1) a rigidity-imparting base member,
   (2) a print sheet member, directly bonded to said base member, comprising a fibrous sheet impregnated with a substantially insoluble and infusible melamine-formaldehyde resin, and
   (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 50% to about 98% by weight of methyl methacrylate, (b) from about 2% to about 20% by weight of acrylic acid, and (c) from 0% to about 45% by weight of ethyl arcylate, the weights of said (a), (b) and (c) each being based on the total weight of monomers in said copolymer, and (B) a plasticizing quantity of from 10–100% by weight based on the weight of the reactive copolymer of hexakis(methoxymethyl)melamine, said hexakis(methoxymethyl)melamine also serving to cross-link said copolymer.

5. A unitary, heat- and pressure-consolidated laminated article which comprises a superimposed assembly of:
   (1) a rigidity-imparting base member,
   (2) a print sheet member, directly bonded to said base member, comprising a fibrous sheet impregnated with a substantially insoluble and infusible melamine-formaldehyde resin, and
   (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 50% to about 98% by weight of methyl methacrylate, (b) from about 2% to about 20% by weight of acrylamide, and (c) from 0% to about 45% by weight of ethyl acrylate, the weights of said (a), (b) and (c) each being based on the total weight of monomers in said copolymer, and (B) a plasticizing quantity of from 10–100% by weight based on the weight of the reactive copolymer of hexakis (methoxymethyl)melamine, said hexakis(methoxymethyl)melamine also serving to cross-link said copolymer.

6. A unitary, heat- and pressure-consolidated laminated article which comprises a superimposed assembly of:
   (1) a rigidity-imparting base member,
   (2) a print sheet member, directly bonded to said base member, comprising a fibrous sheet impregnated with a substantially insoluble and infusible melamine-formaldehyde resin, and
   (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 50% to about 98% by weight of methyl methacrylate, (b) from about 2% to about 20% by weight of methacrylamide, and (c) from 0% to about 45% by weight of ethyl acrylate, the weights of said (a), (b) and (c) each being based on the total weight of monomers in said copolymer, and (B) a plasticizing quantity of from 10–100% by weight based on the weight of the reactive copolymer of hexakis(methoxymethyl)melamine, said hexakis(methoxymethyl)melamine also serving to cross-link said copolymer.

7. A unitary, heat- and pressure-consolidated laminated article which comprises a superimposed assembly of:
   (1) a rigidity-imparting base member,
   (2) a print sheet member, directly bonded to said base member, comprising a fibrous sheet impregnated with a substantially insoluble and infusible melamine-formaldehyde resin, and
   (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 50% to about 98% by weight of methyl methacrylate, (b) from about 2% to about 20% by weight of $\beta$-hydroxyethyl methacrylate, and (c) from 0% to about 45% by weight of ethyl acrylate, the weights of said (a), (b) and (c) each being based on the total weight of monomers in said copolymer, and (B) a plasticizing quantity of from 10–100% by weight based on the weight of the reactive copolymer of hexakis(methoxymethyl)melamine, said hexakis(methoxymethyl)melamine also serving to cross-link said copolymer.

8. A unitary, heat- and pressure-consolidated laminated article which comprises a superimposed assembly of:
   (1) a rigidity-imparting base member,
   (2) a print sheet member, directly bonded to said base member, comprising a fibrous sheet impregnated with a substantially insoluble and infusible melamine-formaldehyde resin, and
   (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 65% to about 90% by weight of methyl methacrylate, (b) from about 5% to about 10% by weight of methacrylic acid, and (c) from 0% to about 45% by weight of ethyl acrylate, the weights of said (a), (b) and (c) each being based on the total weight of monomers in said copolymer, and (B) from about 10% to about 100% by weight, based on the weight of said copolymer, of hexakis(methoxymethyl)melamine, said hexakis(methoxymethyl)melamine also serving to cross-link said copolymer.

9. A unitary, heat- and pressure-consolidated laminated article which comprises a superimposed assembly of:
   (1) a rigidity-imparting base member,
   (2) a print sheet member, directly bonded to said base member, comprising a fibrous sheet impregnated with a substantially insoluble and infusible melamine-formaldehyde resin, and
   (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 65% to about 90% by weight of methyl methacrylate, (b) from about 5% to about 10% by weight of acrylic acid, and (c) from 0% to about 45% by weight of ethyl acrylate, the weights of said (a), (b) and (c) each being based on the total weight of monomers in said copolymer, and (B) from about 10% to about 100% by weight, based on the weight of said copolymer, of hexakis(methoxymethyl)melamine, said hexakis(methoxymethyl)melamine also serving to cross-link said copolymer.

10. A unitary, heat- and pressure-consolidated laminated article which comprises a superimposed assembly of:
    (1) a rigidity-imparting base member,
    (2) a print sheet member, directly bonded to said base member, comprising a fibrous sheet impregnated with a substantially insoluble and infusible melamine-formaldehyde resin, and
    (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 65% to about 90% by weight of methyl methacrylate, (b) from about 5% to about 10% by weight of acrylamide, and (c) from 0% to about 45% by weight of ethyl acrylate, the weights of said (a), (b) and (c) each being based on the total weight of monomers in said copolymer, and (B) from about 10% to about 100% by weight, based on the weight of said copolymer, of hexakis(methoxymethyl)melamine, said hexakis(methoxymethyl)melamine also serving to cross-link said copolymer.

11. A unitary, heat- and pressure-consolidated laminated article which comprises a superimposed assembly of:
    (1) a rigidity-imparting base member,
    (2) a print sheet member, directly bonded to said base member, comprising a fibrous sheet impregnated with a substantially insoluble and infusible melamine-formaldehyde resin, and
    (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 65% to about 90% by weight of methyl methacrylate, (b) from about 5% to about 10% by weight of methacrylamide, and (c) from 0% to about 45% by weight of ethyl acrylate, the weights of said (a), (b) and (c) each being based on the total weight of monomers in said copolymer, and (B) from about 10% to about 100% by weight, based on the weight of said copolymer, of hexakis(methoxymethyl)melamine, said hexakis(methoxymethyl)melamine also serving to cross-link said copolymer.

12. A unitary, heat- and pressure-consolidated laminated article which comprises a superimposed assembly of:
    (1) a rigidity-imparting base member,
    (2) a print sheet member, directly bonded to said base member, comprising a fibrous sheet impregnated with a substantially insoluble and infusible melamine-formaldehyde resin, and
    (3) a clear thermoset resin layer, directly bonded to said print sheet member, comprising a substantially insoluble and infusible resinous composition which, in its thermosetting state, comprises (A) a reactive, water-insoluble emulsion copolymer of (a) from about 65% to about 90% by weight of methyl methacrylate, (b) from about 5% to about 10% by weight of β-hydroxyethyl methacrylate, and (c) from 0% to about 45% by weight of ethyl acrylate, the weights of said (a), (b) and (c) each being based on the total weight of monomers in said copolymer, and (B) from about 10% to about 100% by weight, based on the weight of said copolymer, of hexakis(methoxymethyl)melamine, said hexakis(methoxymethyl)melamine also serving to cross-link said copolymer.

References Cited by the Examiner

UNITED STATES PATENTS

| | | | |
|---|---|---|---|
| 2,906,724 | 9/1959 | Daniel | 260—856 |
| 2,977,272 | 3/1961 | Pounds | 260—856 |
| 3,021,239 | 2/1962 | Lindenfelser et al. | 161—232 |
| 3,033,811 | 5/1962 | Brown et al. | 260—29.4 |
| 3,049,458 | 8/1962 | Willard | 161—165 |
| 3,107,227 | 10/1963 | Sven et al. | 260—45.2 |

ALEXANDER WYMAN, *Primary Examiner.*

EARL M. BERGERT, *Examiner.*